United States Patent [19]

Marks et al.

[11] 3,990,087
[45] Nov. 2, 1976

[54] 3-DIMENSIONAL CAMERA

[76] Inventors: Alvin M. Marks; Mortimer Marks, both of c/o Marks Polarized Corp. 153-16 10th Ave., Whitestone, N.Y. 11357

[22] Filed: Oct. 21, 1974

[21] Appl. No.: 516,676

[52] U.S. Cl. .............................. 354/117; 350/132; 350/159; 352/60
[51] Int. Cl.² .................................... G03B 35/08
[58] Field of Search ................... 354/110, 115, 117; 352/57, 58, 60, 86, 43; 350/132, 133, 145, 147, 159

[56] References Cited
UNITED STATES PATENTS

| | | | |
|---|---|---|---|
| 1,454,218 | 5/1923 | Folmer | 354/110 |
| 2,329,294 | 9/1943 | Ramsdell | 354/117 |
| 2,495,288 | 1/1950 | Richards | 354/117 |
| 2,516,718 | 7/1950 | Oriol | 354/117 |
| 2,693,128 | 11/1954 | Dewhurst | 354/117 |
| 2,991,690 | 7/1961 | Grey | 354/115 |
| 3,363,966 | 1/1968 | Hoch | 354/115 |
| 3,663,085 | 5/1972 | Davis | 350/132 |

*Primary Examiner*—Russell E. Adams, Jr.

[57] ABSTRACT

This invention relates to a reflex camera device having a single lens for the photography of right and left images from an object space transmitted as first and second light ray bundles from two positions separated by an interocular distance onto a single frame of a single film strip; a first set of mutually extinguishing filters such as polarizers, one filter of the set along each of the first and second light ray bundles; a single frame aperture; a second set of mutually extinguishing filters near the image plane to separate the first and second light ray bundles from each position respectively into right and left adjacent images onto the single frame; means to control convergence, focus and interocular distance; and a reflex viewer containing a third set of mutually extingusihing filters to enable the simultaneous viewing and photographing of right and left adjacent images.

28 Claims, 7 Drawing Figures

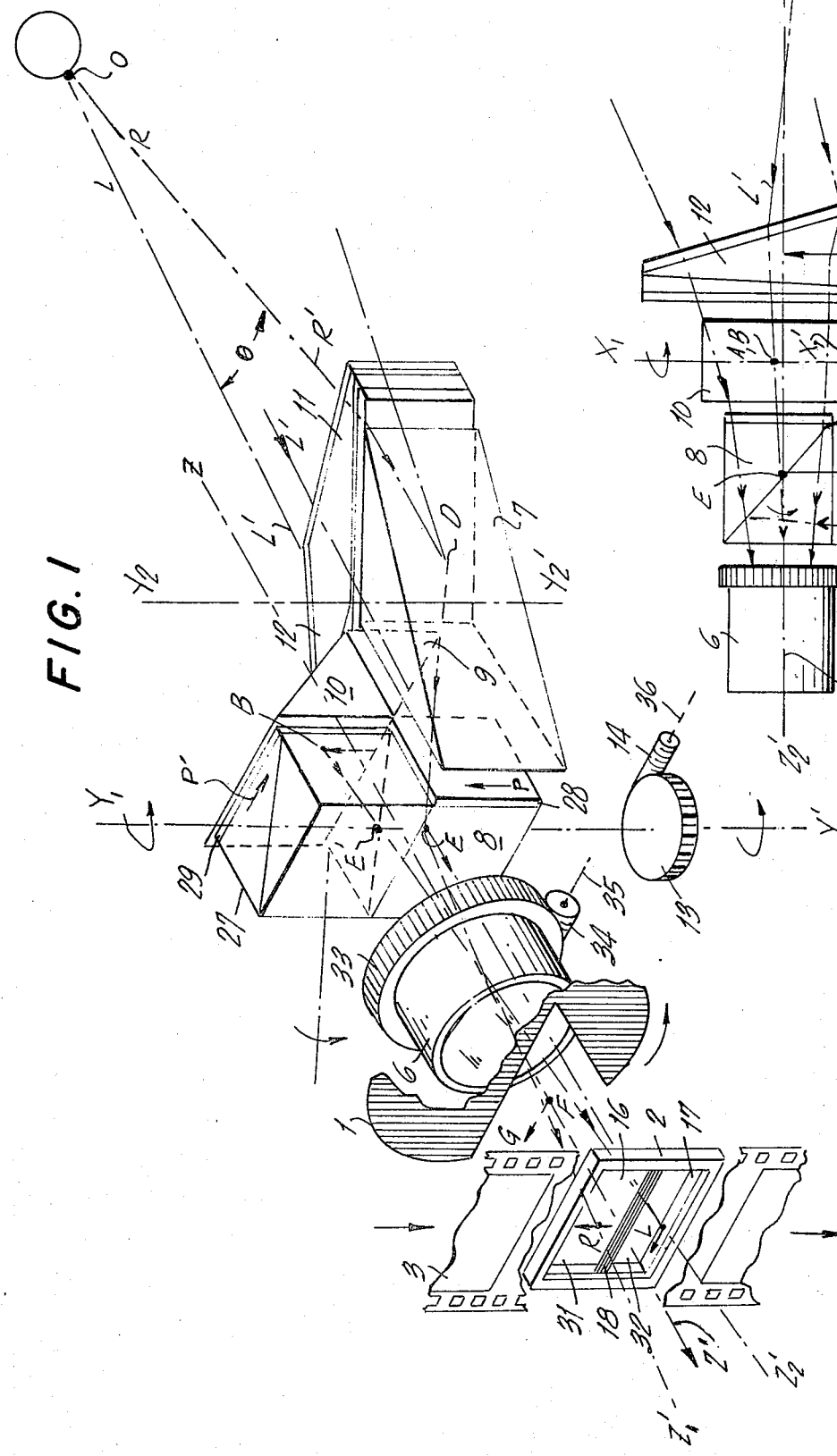
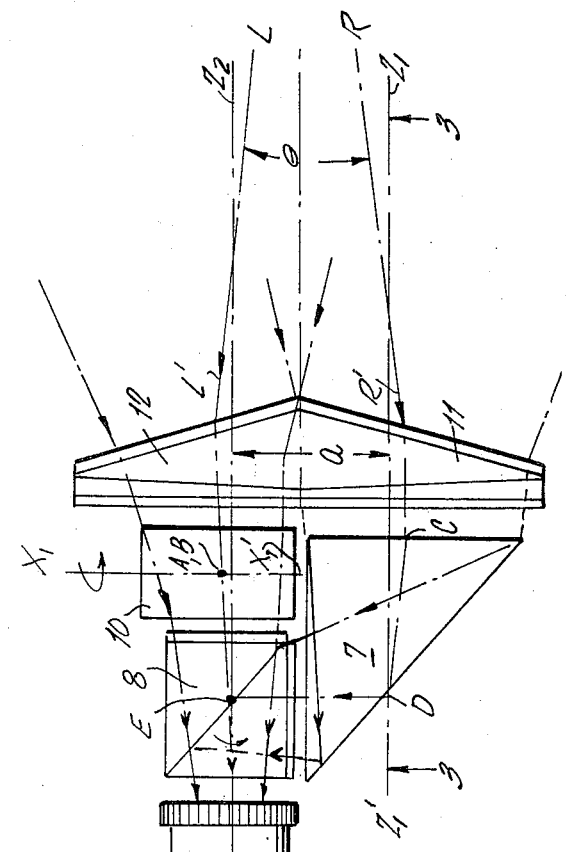
FIG. 1
FIG. 2

OBJECT DISTANCE CONTROL DIAL

TRACKING SPEED CONTROL DIAL

3-DIMENSIONAL CAMERA

This invention relates to a reflex camera device for 3-dimensional photography. With this device, right and left light ray bundles from the object space being photographed carry the right and left images, respectively, to two positions, separated by an interocular distance, and these images are placed on adjacent areas of a frame of a film strip. Means are provided to control convergence, focus and interocular distance. A reflex viewfinder enables the simultaneous viewing and photographing of the right and left images.

BACKGROUND OF THE DISCLOSURE

The prior art shows many devices for photographing images from two positions separated by an interocular distance to form right and left adjacent images onto a frame of a film strip, one above the other or side by side; or two cameras for photographing right and left images from two positions separated by an interocular distance onto two film strips; subsequently the corresponding right and left images on frames from these two film strips were combined by uniform or anamorphic reduction to form right and left adjacent images side by side or one over the other on a single frame of a single film strip. In the former, mechanical devices such as rotating mirrors or shutters with reflecting or prism beam splitters, or a double lens system was used. These former devices were complex, lacked control of essential variables, or were limited in angular aperture. In the latter, the process of of combining two film strips onto a single film strip was costly because of the use of two film strips, and the precision registration and reduction techniques required. These difficulties inhibited the production of 3-dimensional motion pictures.

The present invention overcomes the difficulties of the prior art by a device which uses a conventional single strip motion picture camera with a single lens, and which provides a wide angle aperture, adjustable convergence and focal length. The device of the present invention contains no mechanical moving parts except the conventional camera shutter mechanism and controls. The device comprises relatively simple and inexpensive optical elements in a compact unit attached to a standard monocular camera, preferably of the reflex type, to enable the scene to be photographed while simultaneously presenting the right and left adjacent images to the cameraman, so that the convergence and focal length may be adjusted as required.

It is an object of this invention to provide a simple inexpensive optical device to adapt a monocular motion picture camera for the photography of 3-dimensional motion pictures.

It is an object of this invention to employ a single lens with mutually extinguishing pairs of filters before and after the lens to image right and left adjacent images on a single frame of the film at the gate, and at a reflex viewfinder.

It is an object of this invention to provide an optical device for adapting a monocular motion picture camera for the photography of 3-dimensional motion pictures in which the convergence, focus, and interocular distance is controlled simultaneously or independently while the scene being photographed is viewed by the cameraman through a reflex viewfinder.

It is an object of this invention to provide a compact optical device which has no moving mechanical parts other than the angular or distance adjustments of its optical elements for photographing right and left adjacent images onto a single frame of a single strip film.

It is also an object of this invention to provide a binocular viewer or viewfinder to fuse adjacent stereo image pairs into a 3-D image in a viewing device.

Other objects and various further features of novelty and invention will be pointed out or will occur to those skilled in the art from a reading of the following specification in conjunction with the accompanying drawings. These drawings show, for illustrative purposes only, preferred forms and techniques of the invention:

DESCRIPTION OF THE DRAWINGS

FIG. 1 shows diagrammatically an isometric exploded view of the 3-dimensional camera device according to this invention.

FIG. 2 is a plan view section through an optical device according to this invention.

Referring now to FIg. 1, there is shown an isometric exploded view of the 3-dimensional camera device according to this invention. In this Figure, the optical elements, principal rays and major adjustments are diagrammatically shown. Only the necessary conventional camera elements are shown in this view. The camera employed may be of the reflex type, such as the Arriflex 35mm camera which is often employed in professional motion picture photography. This camera has a revolving 45° conical shutter element 1, the front solid surfaces of which are reflecting. The stereo image rays are deflected at F in the direction FG normal to the Z Z' axis toward the viewing device. The image photographed at the gate plate 2 onto the film strip 3 is also projected identically into the viewfinder 4. The shutter 1 occludes the film gate 2 while the film strip 3 is being drawn down to the next frame by a mechanism not shown. Light from the scene being photographed proceeds along horizontal axes L L' and R R', which are in the same plane and converge to a point O in space at a distance $p$, as shown in FIG. 5. The angle between axes L L' and R R' is $\theta$. The right and left adjacent image pairs are seen fused in the viewfinder 4, shown in FIG. 7, exactly as they will appear when projected on a screen in 3-D.

Figure 3:
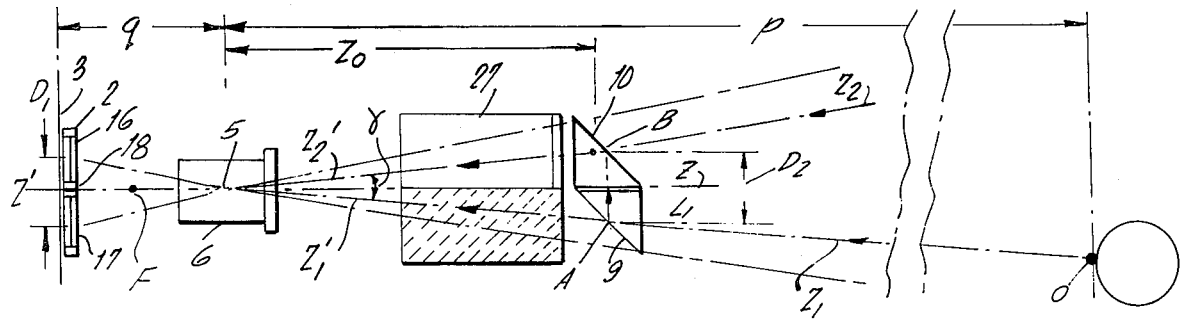
FIG. 3 is a diagrammatic side view vertical section through the optical elements of the present invention.

By a deflector is meant an optical element when reflects a ray by a mirror, total internal reflecting prism, or a half-silvered reflecting plane. By vertical is meant the Y axis; by horizontal, the X axis; the Z axis is the optical axis Z Z' of the camera lens 6. Axes X, Y, and Z are normal to each other. $Z_1 Z_1'$ is the first optical axis of the upper or first image in the gate which passes through its optical center and the optical center 5 of the lens 6. $Z_2 Z_2'$ is the second optical axis of the lower or second image in the gate which passes through its optical center and the optical center 5 of the lens 6. A solid glass element rather than a mirror and air path is used to decrease the angular divergence of the ray bundles, enabling a closer packing of the elements, enabling a standard interocular distance a of about 67mm to be maintained.

By a polarizing axis is meant that direction of the filter parallel to the transmitted electric vector of light, which is known crystalline polymeric polarizers is parallel to the stretch axis of the polarizing material.

In FIG. 1, there is shown for horizontally deflecting the right stereo image light ray bundles along R R' to pass along the first optical axis $Z_1 Z_1'$, a first fixed horizontal deflector 7, and a second horizontal rotatable deflector 8, having a vertical axis $Y_1 Y_1'$. There is also shown a first vertical deflector 9 and a second vertical deflector 10, which may be total internal reflecting 45° prisms or mirrors to vertically deflect the left stereo image light ray bundles along L L' to pass along the second optical axis $Z_2 Z_2'$.

The light ray bundles of the right and left images coverge to the optical center of the lens through an angle determined by the field of view of the lens. For example, in a 50mm lens, the field of view if 24° horizontally and about 12° vertically. With glass elements this divergence is decreased by a factor of $n$, the index of refraction of the glass. Thus, the horizontal divergence of these light ray bundles in glass, in the horizontal plane, is ~18°, or 9° on each side of the central axis of the light ray bundles. The vertical divergence of these light ray bundles in glass is ~8°, or 4° above and below the axis of the light ray bundles. To accommodate this converging light ray bundle through the first horizontal deflector 7, the ray CD diverges from the ray BE'. To enable convergence to near or far images, a set of achromatic prisms 11 and 12 is provided. These achromatic prisms have a deviation of about 5° each, or a total of about 10°.

To provide convergence control, for example, from ∞ to 1 meter, the adjustment of the angle $\theta$ between the optical axes R R' and L L' of the right and left images if from 0° to about 4°. A rotation of the second horizontal deflector 8 by $\alpha$ degrees changes the reflected ray DE by $2\alpha$, and changes the direction of the ray CD by $2(2\alpha) = 4\alpha$ at the first horizontal deflector 7. As the second horizontal deflector 8 is rotated 1° around the vertical axis $Y_1 Y_1'$ by the worm gear 13 and the worm 14, the convergence angle $\theta$ changes 4°. The deflector 8 may have various forms. In one embodiment it is a cube with a half-silvered diagonal plane convering the entire lens aperture. In a second embodiment, it is a totally reflecting prism across only the half plane below the optical axis Z Z' of the lens 6, and a fixed or rotatable solid cube occupies the half plane above the optical axis Z Z'.

The left and right ray bundles diverge from a point O in the object space which is at a distance $p$ from the optical center 5 of the lens 6. Simultaneously, as the convergence angle $\theta$ is changed, the change in the distance p is accomplished by rotating the lens worm gear 13 and worm 14. The worm gear 13 rotates the lens 6 and moves it back and forth along its axis Z Z' to focus the image at the plane of the gate 2. The film 3 passes the gate 2, which is divided into two areas, an upper image in a first area 16 for the right image, and a lower image in a second area 17 for the left image. The right and left, upper and lower images 16 and 17, respectively, are separated by a dark bar 18. The dark bar 18 provides a sharp upper and lower border to the projected images upon the screen, as described in related application, Ser. No. 329,733, filed Feb. 5, 1973. The shutter 1, shown in cutaway section, has a reflecting surface which deflects the image along a path FG toward mutually extinguishing filters 19 shown in FIG. 6 at the diffusion screen 15 at the image plane of the viewfinder 4 shown in FIG. 7.

Figure 6:
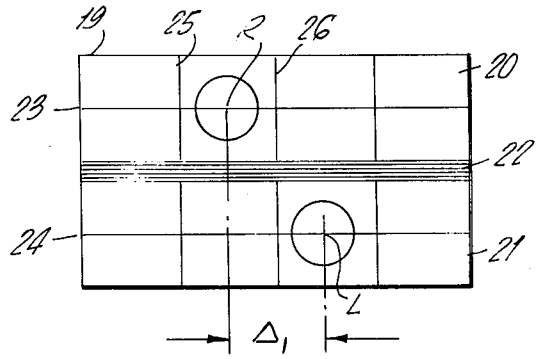
FIG. 6 shows the right and left images as they appear in the film gate and image plane of the viewfinder.

Referring to FIG. 6, the mutually extinguishing filters 19 have upper and lower areas 20 and 21, respectively, separated by the dark bar 22. Horizontal cross hairs 23 and 24 bisect the areas 20 and 21 respectively. Vertical cross hairs 25, 26, etc. extend across the areas 20 and 21. The horizontal displacement $\Delta$ between a right inverted image R of point O and left inverted image L of point O on areas 20 and 21 respectively may be calibrated against the convergence angle $\theta$; for example at $\Delta_1 = O$, $\theta = O$ and the convergence distance $p = \infty$; at $\Delta_1 = 5mm$, $\theta = 4°$, and the convergence distance $p = $ 1 meter. The horizontal cross hairs 23 and 24 are used to vertically align the right and left images at infinity and to thus establish a fixed reference distance separating the upper and lower images. If a constant distance is not maintained between the upper and lower, right and left images respectively, then these distances must be adjusted during the printing of the film. This difficult and costly procedure is eliminated by the present invention.

Referring now to FIGS. 2 and 3, the path of the light ray bundles of the right and left images are now traced. The light ray bundles of the right image proceed along the axis R R' through the first converging achromatic prism 11, being reflected at D by the first horizontal deflector 7 along the path DE, whence the rays are reflected by the second horizontal rotatable deflector 8 along the path EF, passing upward through the optical center 5 of the lens 6, to the upper area 16 at the gate 2. The light ray bundles of the left image pass along axis L L' through the second converging achromatic prism 12 toward the first vertical deflector 9, are reflected at A vertically along path AB, and are reflected again by the second vertical deflector 10, along the line BC; then downward through the optical center 5 of the lens 6 to the lower area 17 of the gate 2.

The path BC passes through the glass block 27, which may be an extension of the second horizontal deflector 8. To provide vertical adjustment of the right and left stereo images at the film gate 2 and the focal plane of the viewfinder 4, the second vertical deflector 10 may be rotated through a few degrees about the $X_1 X_1'$ axis. When the appropriate vertical separation of the right and left images is achieved, this position is locked. The first and second vertical deflectors 9 and 10 displace and rotate the light ray bundles from the axis L L', respectively, by a vertical distance $D_2$, and an angle $\gamma$, toward the second image are 17, along the second optical axis $Z_2 Z_2'$.

The first set of mutually extinguishing filters 19 comprises a right polarizing filter 28 and a left polarizing filter 29, which may, for example, have a vertical polarizing axis; and a horizontal polarizing axis, respectively; shown mounted and laminated to faces of the rotable second horizontal deflector 8 and the glass block 27.

Figure 4:
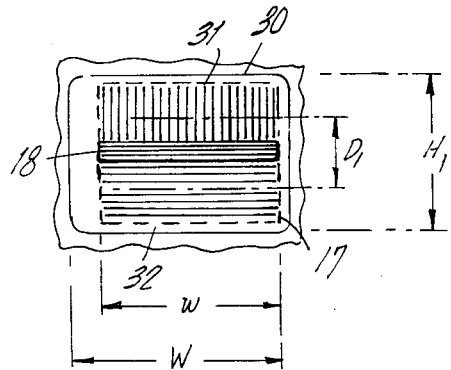
FIG. 4 is a drawing of polarized filter elements utilized in the gate and viewfinder of the camera.

FIG. 4 shows the second set of mutually extinguishing filters 30 which comprise polarizing filters 31 and 32 with a dark bar separator strip 18 between them, laminated between or on glass or plastic and mounted in proximity to the film strip 3 at the gate 2. The filter set comprises an upper polarizing filter 31 in area 16, polarized with its axis of polarization vertical, and the lower polarizing filter 32 in area 17 is polarized with its axis of polarization horizontal.

The camera lens 6 focuses the object at intersection point O onto the plane of the film 3 at the gate 2. The lens position along its optical axis Z Z' is controlled in the usual manner by rotating the lens barrel, using a worm gear 33 turned by the worm 34 on shaft 35. The convergence angle $\theta$ of the right and left optical axis R R' and L L' respectively to their intersection point O varies from 0° to 4°, controlled by a rotation of the second horizontal deflector around the $Y_1 Y_1'$ axis, which passes vertically through its diagonal plane. The deflector 8 is mounted on the shaft of the worm gear 13, which also has $Y_1 Y_1'$ as its axis. The convergence control shaft 36 rotates the worm 14, worm gear 13 and deflector 8. To automatically coordinate convergence and focus, the shafts 35 and 36 may be mechanically interlocked. Light ray bundles carrying both the right and left images are mixed and pass through the same lens 6 which is a common channel for these rays. These mixed light rays are distinguished and separated into the right and left adjacent images on a single frame of the film 3 by the first and second sets of mutually extinguishing polarizing filters.

Thus, the ray bundle carrying the right image is polarized vertically by polarizing filter 28 and is extinguished by the lower horizontally polarizing filter 32 at the lower area 17 of the film gate 2, and is admitted by the upper vertically polarizing filter 31 at the upper area 16 of the film gate 2; and the ray bundle carrying the left image is polarized horizontally by the polarizing filter 29, and is extinguished by the upper vertically polarizing filter 31 at the upper area 16 of the film gate 2, and admitted by the lower horizontally polarizing filter 32 at the lower area 17 of the film gate 2. The right and left images thus appear only in the appropriate areas 16 and 17 on the film strip 3 above and below the central dark bar separator strip 18.

The angular adjustments of the second horizontal deflector 8 around the vertical axis $Y_1 Y_1'$ and of the second vertical deflector 10 around the horizontal axis $X_1 X_1'$, respectively, enable the right and left images to be centered in their respective positions at the gate and at the viewfinder. The angular adjustment of second horizontal deflector 8 controls the convergence angle $\theta$ of the light ray bundles carrying the right and left images.

Figure 5:
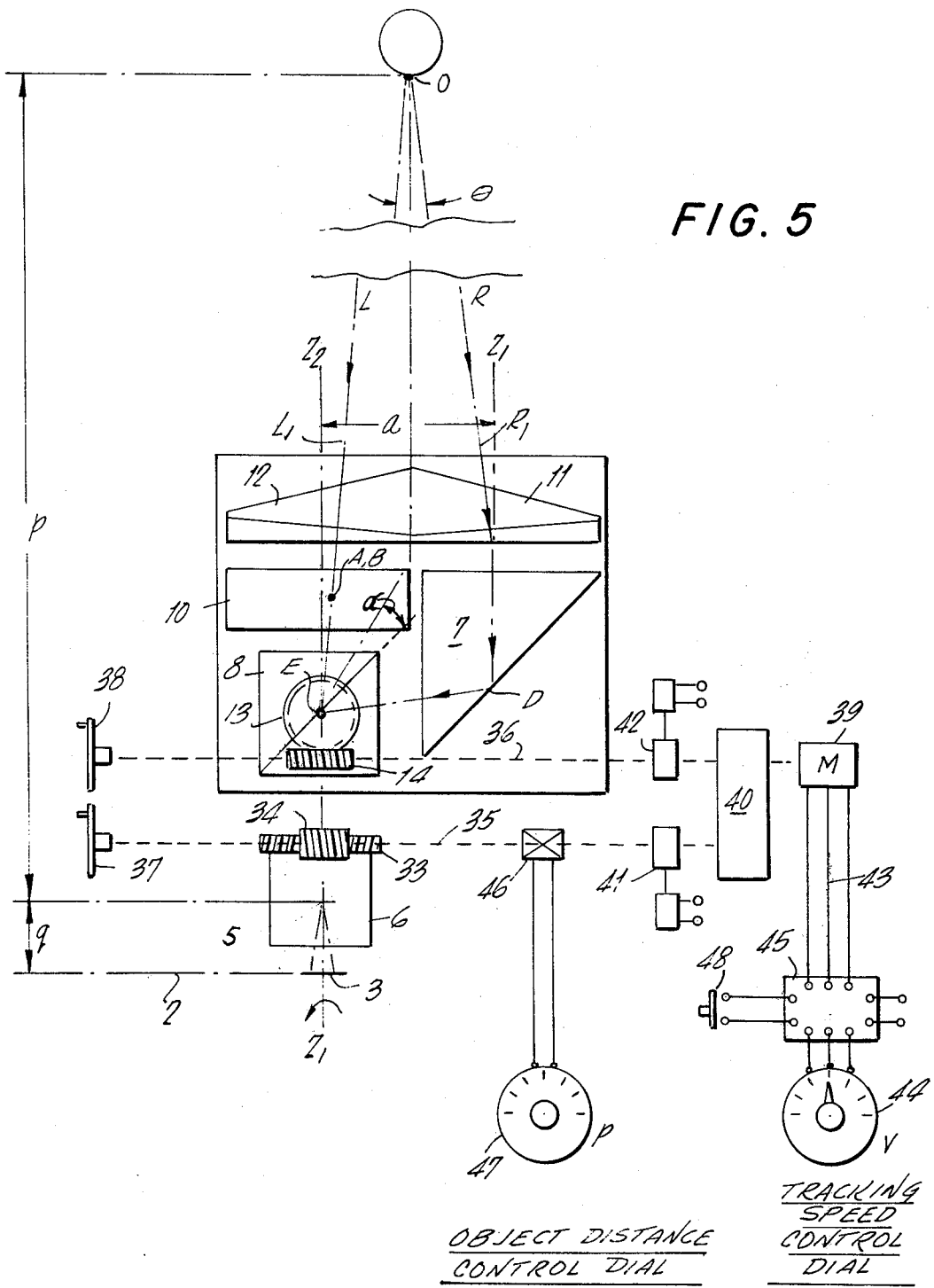
FIG. 5 shows an electromechanical system for controlling convergence and focus independently or simultaneously.

Referring to FIG. 5, shafts 35 and 36 are provided with the external calibrated dials 37 and 38, respectively. To vary the divergence of the right and left images, the second deflector 8 is turned through an angle $\alpha$ from 0° to about 1°, by the worm gear 13, which may have for example 360 teeth. A single turn of the shaft 36 then causes the deflector 8 to turn through an angle of 1°. The dial 38 may be calibrated in 100 divisions, of 0.01° per division. Assuming that, for an object O from infinity to 1 meter from the lens center 5 the lens worm gear 33 requires a rotation of 45° to vary the distance $q$ from the lens center to the image plane 2 on the film strip 3; then one turn of the shaft 35 rotates gear 33 by 45°, or ⅛ turn. In this case, the gear combination 33, 34 may comprise sprial gears with an 8:1 ratio.

A motor 39 drives the gear box 40 and shafts 35 and 36 through the clutches 41 and 42, respectively. The motor/gear box 39, 40 may be an integral assembly, powered via electric leads 43, and its speed by control dial 44 via a conventional speed control electric circuit 45. This drive and clutch mechanism allows the coupling or independent control of the convergence angle $\theta$ of the axes L L' and R R' and the focus onto the object O at a distance $p$ from the optical center 5 of the lens 6. When the clutches are engaged, the difference angle $\Delta\alpha$ and the difference distance $\Delta q$ of the optical center 5 of the lens 6 to the film plane 3 are coupled, and $\Delta q$ is proportional to $\Delta\alpha$.

To control tracking toward or away from the camera of the convergence and focus, the motor 39 may be reversed by the speed control dial 44. The clutches 41 and 42 may be disengaged and the dials 37 and 38 set to independently focus and coverge. For example, by rotating the second horizontal deflector 8, the image axes may be converged upon a near or far object. The focus may be independently adjusted near or far. If it is required to simultaneously converge and focus upon an object, and if the object is moving toward or away from the camera, the focus and convergence may simultaneously track either rapidly or slowly by engaging the clutches 41 and 42, setting the dial 44 for positive or negative tracking speed (object moving toward or away from the camera) depending upon the motion of the object relative to the camera; and the dial 47 for the distance $p$ of the object to the camera which controls the shaft angle differential 46. Push button control 48 actuates the tracking. The cameraman simultaneously observes the right and left images at the diffusion screen 15, using a monocular eyepiece on the viewfinder, such as 53, without prism or polarizer. The images then are seen one over the other just as they will appear on the film. Alternatively, utilizing the two binocular eyepieces 53 and 54, the image is seen in 3-D as herein described in connection with FIG. 7. The cameraman is thus able to automatically track or independently control the focus and convergence.

When there is little or no vertical parallax, all objects on the same level will appear on the same horizontal line. With vertical parallax, left and right images of far and near objects may be aligned horizontally on one image, but the same objects will appear vertically displaced on the other image. For a satisfactory 3-D presentation, this condition cannot be tolerated if the vertical parallax exceeds a few percent of the picture height. If the vertical deflection $D_2$ and angle $\gamma$ are not correctly adjusted, a vertical parallax of near and far images will be observed. Vertical and angular adjustments $D_2$ and $\gamma$, respectively, may be provided on the first and/or second vertical deflectors, to adjust the vertical deflection distance $D_2$ and direction of the left image light ray bundles into a path along the second optical axis $Z_2 Z_2'$.

SYMBOLS $a$ = interocular distance
$b$ = width of bar separator
$d$ = differential
$f$ = focal length of lens
$h$ = height of stereo image
$k, k_1, k_2, k_3$ = constants
$n$ = index of refraction of the glass elements
$p$ = distance of the object to the optical center of the lens
$p_o$ = initial distance of object to center of camera lens
$q$ = distance from optical center of lens to plane of film
rpm = revolutions per minute
$t$ = time $w$ = frame width of stereo image
$z_o$ = distance between the optical center and vertical deflection path AB
$D_1$ = distance between centers of upper and lower images
$D_2$ = AB, the vertical deflection distance
$H$ = standard frame height
$K = 4f^2/a$
$V$ = velocity of approach or recession of object from camera
$W$ = standard frame width
$\alpha$ = angle by which reflecting plane of deflector differs from 45° position of that plane relative to X axis
$\beta$ = angle through which lens worm gear is turned
$\gamma$ = angle between axes $Z_1 Z_1'$ and $Z_2 Z_2'$
$\Delta_1$ = horizontal displacement between a corresponding point on right and left images
$\theta$ = convergence angle between intersection of optical axes L L' and R R'
$\omega_c$ = angular velocity of convergence shaft
$\omega_f$ = angular velocity of focus shaft
$\Delta$ = difference

MATHEMATICAL OPTICS SECTION

For a simple lens system:

$$1/f = 1/p + 1/q \quad (1)$$

Solving for a distance between a film plane and the optical center, $q$:

$$q = fp/(p-f) \quad (2)$$

Differentiating:

$$(dq/dp) = -f^2/(p-f)^2 \quad (3)$$

Since usually, $p \gg f$:

$$dq \approx -(f/p)^2 \cdot dp \quad (4)$$

For small $\theta$, the relationship between the distance of the object to the optical center of the lens $p$ and the interocular distance $a$ is:

$$p \approx a/\theta \quad (5)$$

Differentiating:

$$dp = (-a/\theta^2)d\theta \quad (6)$$

From (4), (5), and (6):

$$dp = -(f\theta/a)^2 (-a/\theta^2) \, d\theta \quad (7)$$

which reduces to:

$$\Delta q = (f^2/a)\Delta\theta \quad (8)$$

The relationship between the change in the angle of the second horizontal deflector $\Delta\alpha$ and the change in the angle $\Delta\theta$ between the optical axes of the right and left images is:

$$\Delta\theta = 4 \Delta\alpha \quad (9)$$

From (8) and (9):

$$\Delta q = (4f^2/a)\Delta\alpha = K \Delta\alpha \quad (10)$$

The change in $\Delta q$ is usually accomplished by turning the barrel of the lens 6 through an angle $\Delta\beta$. The barrel is threaded into the lens mounting which axially shifts the lens a distance $\Delta q$ for a change of barrel angle $\Delta\beta$. That is:

$$\Delta\beta = k\Delta q \quad (11)$$

From (10) and (11):

$$\Delta\beta = k \, K\Delta\alpha = k_1 \Delta\alpha \quad (12)$$

Equation (12) shows that the angle $\Delta\alpha$ through which the second horizontal deflector 8 is rotated to adjust the convergence is directly proportional to $\Delta\beta$, the angle through which the lens worm gear 33 is turned to obtain a sharp image on the film plane at the gate 2.

For an interocular distance fixed at $a = 67$mm, the average constant distance between the right and left human eyes, the constant term $K = 4f^2/a$ is about 38 for a 25mm lens, 150 for a 50mm lens, and 300 for a 70mm lens.

The angle $\theta$ between the optical axes of the right and left lenses varies from zero at $p = \infty$ to about 4° at $p = 1$mm, usually the closest working distance to a camera. Consequently $\Delta\alpha$ varies from zero to $\approx 1°$.

EXAMPLE 1

Given: A lens of focal length $f = 50$mm, the interocular distance $a = 67$mm, and $\theta$ set initially at 0, with the object distance $p = \infty$.

The object distance is changed to $p = 1$mm, or $10^3$mm, by rotating the second horizontal deflector 8 through an angle $\Delta\alpha$.

Find:
1. $\Delta\theta$
2. $\Delta\alpha$
3. $\Delta q$

Solution:
From (5):
$\theta = a/p = 67/10^3$ radians $= 6.7 \times 10^{-2} \cdot (180/\pi)°$ $\theta = 3.8°$
$\Delta\theta = 3.8 - 0 = 3.8°$ \hfill Ans. (1)

From (9):

$\Delta\alpha = \Delta\theta/4 = 0.96° \approx 1°$ \hfill Ans.(2)

From (10):
$\Delta q = (4f^2/a) \Delta\alpha = [4(50)^2/67] \cdot 0.96 \, (\pi/180) \approx 2.5$ mm \hfill Ans. (3)

EXAMPLE 2

In FIG. 5, dial 38 turns through 360° to rotate the second horizontal deflector 8 through $\Delta\alpha = 1°$ to bring the convergence from $\infty$ to 1m. At the same time the dial 37 is turned through 360° to adjust the angle $\Delta\beta$ through 45° for sharp imaging on the film plane. Find the constant $k$:
From (12):

$k = \Delta\beta/\Delta\alpha$ $k = 45/1 = 45$

Answer to Example No. 2
From (5), (9) and (12):

$$\alpha = k_2/p \quad (13)$$

$$\beta = k_3/p \tag{14}$$

$$(dp/dt) = V \tag{15}$$

$$\omega_c = \text{rpm}_c = (d\alpha/dt) = -(k_2/p^2)(dp/dt) = -k_2 V/p^2 \tag{16}$$

$$\omega_f = \text{rpm}_f = (d\beta/dt) = -(k_3/p^2)(dp/dt) = -k_3 V/p^2 \tag{17}$$

From (16) and (17):

$$(\omega_c/\omega_f) = (\text{rpm}_c/\text{rpm}_f) = (k_2/k_3) = k_4 \tag{18}$$

Integrating (15) and evaluating the constant of integration:

$$p = p_o \pm Vt \tag{19}$$

Referring to FIG. 5, dial 44 sets the estimated speed ±V of the object toward or away from the camera, and dial 47 sets the approximate distance $p_o$ of the object from the camera. Dial 47 turns with time. To start, set the dial 47 at $p_o$ and the dial 44 at ±V; then the dial 47 will turn according to (19); thus, V and $p_o$ are always under the control of the cameraman.

For lenses 6 of different focal lengths, the angle γ between the optical axes $Z_1 Z_1'$ and $Z_2 Z_2'$, shown in FIG. 3, changes. The angle γ also changes as $q$, the distance of the image plane to the optical center of the lens changes, as the focal plane to the object being photographed in changed, but this change is small. From FIG. 3:

$$D_1 = \gamma q \tag{20}$$

$$D_2 = \gamma z_o \tag{21}$$

Hence:

$$D_2 = D_1 z_o/q \tag{22}$$

From (2) and (22):

$$D_2 = (D_1 Z_o/f)(1-f/p) \tag{23}$$

Since $f \sim 50$mm and $1000 < p < \infty$; $0.04 < f/p < 0$

32mm < f < 100mm
$D_1$ = 9.8mm $z_o \approx 100$mm

Hence:

$$30 < (D_1 z_o/f) < 10 \tag{24}$$

For a 50mm lens γ is computed:

$$\gamma = 9.8/50 \approx 0.2 \text{ radians}$$

$$\gamma = 0.2 \times 57.2 \approx 11.4° \tag{25}$$

The conclusion is that $D_2$ varies a maximum of 4% from ∞ to 1 meter and hence may be held constant without troublesome vertical image parallax. However, in changing lenses from 30 to 100mm focal lengths the angle will change by a factor ~3; and provision must be made to vary $D_2$.

The calculation for $D_2$ is made for an air path. Since most of the distance travelled by the light ray along the axis $Z_2 Z_2'$ is in glass having an index of refraction $n$, the angle γ is decreased to $\approx \gamma/n$ and $D_2$ to $\approx D_2/n$.

Figure 7:
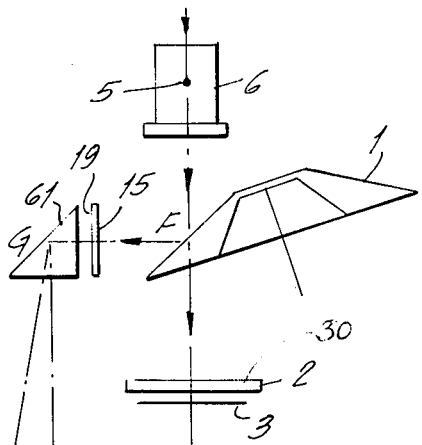
FIG. 7 shows a diagrammatic plan view of a reflex motion picture camera modified according to this invention, and provided with a binocular 3-D viewfinder.
Figure 7:
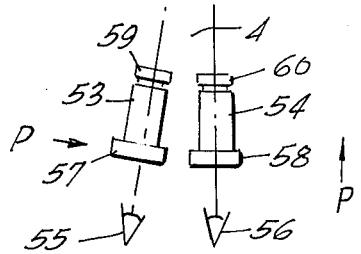

Referring to FIG. 7, there is diagrammatically shown a plan view of the 3-dimensional camera of this invention which includes a binocular viewfinder 4. The rays reflected by the rotating shutter 1 in the direction FG are imaged upon a third mutually extinguishing filter set and reticle 19 and diffusion screen 15 at the image plane shown in FIG. 6. A rear view projection or diffusion screen 15 makes the projected images visible in the viewfinder. Thee third mutually extinguishing polarized filter set and reticle 19 is similar to the second mutually extinguishing filter set 30 at the gate 2, except that it has inscribed horizontal reticle lines 23, 24 and vertical reticle lines 26, 27, etc. The binocular viewfinder 4 comprises binocular inverting eyepieces 53 and 54 in front of the cameraman's eyes, 55 and 56. Polarizers 57 and 58 are respectively polarized horizontally and vertically so that the right eye 56 sees only the imagme appearing on area 20 and the left eye 55 sees only the image appearing on the area 21. The two images are brought into vertical alignment by prisms 59 and 60. Thus, with this binocular viewer, the cameraman reconstructs a 3-dimensional image as it is photographed by the camera, and as it will be seen when projected on a screen. The 3-dimensional binocular viewer shown in FIG. 7 may be employed in other applications. For example, in the editing of 3-dimensional motion picture film, it is necessary for the editor to see the images in 3-D. This may be accomplished by inserting a polarizing filter such as is shown in FIG. 4 over the pair of images on the film in the gate of the Moviola device, and utilizing the binocular viewing device just described; whereby the motion picture images will be superimposed and fused into a 3-dimensional image by the editor.

It is within the purview of the present invention to vary the interocular distance a. An increase in the interocular distance a has been employed in the prior art to increase the depth perception, particularly for distant scenes. In accordance with equation (10) this may be accomplished by an increase or decrease in the constant factor a in this equation and a corresponding gear ratio change. To change a, the distance between the horizontal deflectors 7 and 8 is varied. The first and second horizontal deflectors may be mounted upon separate structures whose distance from each other along the X axis may be controlled in any suitable manner, as for example, a screw mechanism (not shown). The human eyes have a fixed interocular distance a, and it is natural to see 3-dimensional scenes in this manner. The present device operates in an entirely satisfactory manner with a fixed interocular distance a, which may be chosen at 67mm, the means interocular distance of the human eyes. However, for special applications, a means may be provided to vary the interocular distance a.

There is thus provided a 3-dimensional camera device which enables the motion picture photography of stereo image pairs with a relatively simple device. With this device, the cameraman views the stereo pairs as they are photographed onto single frames of a single film strip while simultaneously or independently controlling the convergence and focus, and moving objects may be "tracked" under control of the cameraman. In this manner, 3-dimensional effects are obtained which increase the depth perception of the projected images by the viewer while enhancing their realism and dramatic impact.

In another embodiment of this invention, mutually extinguishing polarizers are mounted with their polarizing axes mutually at 90° and respectively at ±45° to the horizontal. A first set of such filters may be placed between the lens 6 and the first and second positions; a second set of such filters at the film gate 2; and a third set of such filters at the diffusion screen 15 at the image plane of the viewfinder. Referring to the first set of filters in front of the lens 6, there is one polarizer in the half plane above the lens axis Z Z', and the other polarizer in the half plane below the optical axis Z Z'. An advantage of utilizing the ± 45° directions is that the right and left image intensities are more nearly balanced, and the depolarizer, quarter or half wave plates may be eliminated. Further, strain in the glass optical elements will not detract from the blocking effect of the first and second sets of mutually extinguishing filters. With the polarizing axes at ± 45° for mutually extinguishing filters, the reflection from a polished metal surface; that is a half silvered surface or the reflecting surface of the shutter of a reflex camera, introduces a rotation of the planes of polarization by 90°. As a consequence, to provide extinction, the third set of mutually extinguishing filters 19 at the at the diffusion screen 15 at the image plane of the viewfinder has its planes of polarization turned through 90° relative to the second set of mutually extinguishing polarizers at the gate and the polarizers 28 and 29 are both at +45°; after reflection from a half silvered plane the light from DE is rotated through 90°. In other respects with the ± 45° polarizers, this system functions as previously described.

In the embodiments described herein, the R R' axis is displaced by the interocular distance a to the right of the lens axis Z Z', and the L L' axis is approximately in line with Z Z'. In an alternate embodiment, the L L' axis may be displaced to the left and R R' may be approximately in line with Z Z'.

A 3-dimensional camera device according to this invention which utilizes a half silvered cube as the second horizontal deflector requires about 3 stops additional opening on the camera lens since two parallel efficient polarizers transmit 33 to 40% light and the half silvered horizontal deflector cube reflects and transmits about 45% of the light; other losses in the system being small with nonreflecting surfaces on the optical elements. However, when the second horizontal reflector is a total internal reflecting prism in the lower half plane, no light is lost upon total internal reflection, and about 1.7 stops are required.

In another modification, achromatic prisms 11 and 12 may be combined with the first horizontal deflector and the first vertical deflector, respectively, rather than as the separate elements shown herein. Various other embodiments may be made by those skilled in the art which will fall within the scope of this specification and appended claims.

Have thus described the invention, what I wish to claim is:

1. In a 3-dimensional camera device for photographing an object space in 3 dimensions, a first aperture and a second aperture separated by an interocular distance, which respectively receive first and second light ray bundles from said object space, a monocular lens having a first optical axis and a second optical axis passing through the optical center of said lens, a film gate, a film frame at said film gate, a first aperture first deflector, and a first aperture second deflector, to deflect the said first light ray bundle from the said first aperture along said first optical axis, a second aperture first deflector and a second aperture second deflector to deflect the second light ray bundle from said second aperture along said second optical axis, a first set of mutually extinguishing filters located between the said lens and said first and second apertures, a second set of mutually extinguishing filters located at said film gate dividing said film gate into a first area coinciding with the plane of the image of the object space carried by the first light ray bundle, and a second area coinciding with the plane of the image of the object space carried by the second light ray bundle, said first area and said second areas being adjacent at the said film gate, said first optical axis passing through center of said first area and the optical center of said lens, and said second optical axis passing through the center of the said second area and the optical center of said lens, said first and second sets of mutually extinguishing filters causing said first light ray bundle to be transmitted only to said first area and to be excluded from said second area, and causing said second light ray bundle to be transmitted only to said second area and to be excluded from said first area.

2. In a 3-dimensional camera device according to claim 1, means to control the convergence angle of the first and second light ray bundles from the said object space.

3. In a 3-dimensional camera device according to claim 1, means to control the position of the said lens along its axis.

4. In a 3-dimensional camera device according to claim 1, means to control the convergence angle of the first and second light ray bundles from the said object space, and means to control the position of the said lens along its axis.

5. A 3-dimensional camera device according to claim 1, in which said camera is a reflex camera containing a viewfinder, a third set of mutually extinguishing filters, said third set of mutually extinguishing filters being located at the image plane of said viewfinder.

6. A 3-dimensional camera device according to claim 5, in which said viewfinder is monocular and said third set of mutually extinguishing filters divides the image plane into first and second areas at the image plane of said viewfinder identical with said first and second areas of film frame in said gate, the images seen in the said viewfinder being identical with the images photographed on said film frame.

7. A 3-dimensional camera device according to claim 5, in which said viewfinder is binocular, a pair of oculars, a fourth set of mutually extinguishing filters on said oculars, prisms on said oculars, whereby said first and second images appearing at the image plane of said viewfinder are overlapped and appear in 3 dimensions when viewed through said binocular device.

8. A 3-dimensional camera device according to claim 5 in which horizontal and vertical reticle lines are placed at the focal plane of said viewfinder, a calibrated scale to show convergence distance $p$ on said reticle, the displacement $\Delta_1$ of corresponding points of the right and left images measuring said convergence distance $p$.

9. A 3-dimensional camera device according to claim 1, in which the said mutually extinguishing filters are polarizing filters with their polarizing axes at right angles.

10. A 3-dimensional camera device according to claim 9, in which the polarizing axes of the said polarizing filters are respectively in the horizontal and vertical planes.

11. A 3-dimensional camera device according to claim 8, in which a half-wave retardation filter is located between one of the polarizing filters and the object being photographed.

12. A 3-dimensional camera device according to claim 8, in which a depolarizing optical element is located between each of the said plarizing filters and the object being photographed.

13. A 3-dimensional camera device according to claim 1, in which the mutually extinguishing filters are polarizers, the polarizing axes of which are ±45° to the horizontal.

14. A 3-dimensional camera device according to claim 1, a reversible adjustable speed motor, a speed control device connected to said motor, a gear train driven by said motor, said gear train having first and second output shafts whose speeds are proportional and at a controlled ratio to each other, a first coupling device and a second coupling device attached to said first and second output shafts respectively whereby the angle $\alpha$ through which at least one of said horizontal deflectors is rotated, and the distance q of the optical center of the said lens to said film plane is varied in direct ratio to control the simultaneous convergence and focus while tracking an object being photographed as said object moves toward or away from the said camera.

15. A 3-dimensional camera device according to claim 1, first and second achromatic prisms at first and second apertures respectively to converge said first and second light ray bundles.

16. A 3-dimensional camera device according to claim 1, first and second achromatic prisms at first and second apertures respectively to converge the said first and second light ray bundles, said first and second achromatic prisms each having a deviation of about 5°.

17. In a 3-dimensional camera device according to claim 1, a dark bar at the said film gate separating the said frist and second area.

18. In a 3-dimensional camera device according to claim 1, a reflex camera having a viewfinder, a first set of mutually extinguishing filters located between the said lens and said first and second apertures, a second set of mutually extinguishing filters located in proximity to the film plane at the gate, and a third set of mutually extinguishing filters in proximity to the focal plane of the viewfinder; a dark bar between said first and second areas in the film gate, and a dark bar between the first and second areas at the focal plane of the viewfinder.

19. In a 3-dimensional camera device for photographing an object space in 3 dimensions from a first aperture and a second aperture separated by an interocular distance which respectively receive first and second light ray bundles from said object space, a monocula lens having a first optical axis and a second optical axis passing through the optical center of said lens, a film gate, a film gate, a fixed first horizontal deflector, and a rotable second horizontal deflector to horizontally deflect the said first light ray bundle from the said first aperture by the interocular distance to the said rotable second horizontal deflector along said first optical axis, first and second vertical deflectors to vertically deflect the said second light ray bundle from said second aperture along said second optical axis, a first set of mutually extinguishing filters located along the paths of said first and second light ray bundles between said lens and said first and second apertures, a second set of mutually extinguishing filters located at said film gate dividing said film gate into an upper first area coinciding with the plane of the image of the object space carried by the said first light ray bundle, and a lower second area to coincide with the plane of the image of the object space carried by the said second light ray bundle, said first optical axis passing through center of said first area and the optical center of said lens, and said second optical axis passing through the center of the said second area and the optical center of said lens, said first and second sets of mutually extinguishing filters causing the said first light ray bundle to be transmitted only to said first area and to be excluded from said second area, and causing the said second light ray bundle to be transmitted only to said second area and to be excluded from the said first area, means to rotate said second horizontal deflector to control the convergence angle of the said first and said second light ray bundles from the said object space, and means to control the position of the said lens along its axis, whereby the said first and second light ray bundles are imaged respectively at the said first and said second areas, respectively, on the film frame in the said gate.

20. A 3-dimensional camera device according to claim 19 in which the said second horizontal deflector is a rotable beam splitter comprising a transparent cube having a half-silvered diagonal plane.

21. A 3-dimensional camera device according to claim 19 in which the said second horizontal deflector comprises a rotable totally reflecting prism positioned in the lower half plane of the said lens and a transparent block positioned in the upper half plane of the said lens.

22. A 3-dimensional camera device according to claim 19, means for adjusting at least one of said first and second vertical deflectors to control the vertical displacement and direction of the said second light ray bundle.

23. A 3-dimensional camera device according to claim 19, said camera being a reflex camera, a first set of mutually extingushing filters located between said lens and said first and second apertures, a second set of mutually extinguishing filters located in proximity to the film plane at the gate, and a third set of mutually extingushing filters located in proximity to the focal plane of the viewfinder; dark bars between said images in the film gate and at the focal plane of the viewfinder, adjusting means for at least one of said vertical deflectors whereby the said images on said first and second areas are adjusted for vertical position, and vertical parallax.

24. A 3-dimensional camera device according to claim 19, in which the said second horizontal deflector is mounted upon a vertical shaft, a first means to control the angle through which said shaft is turned; and second means for adjusting the distance between the optical center of said lens and said film plane.

25. A 3-dimensional camera device according to claim 19, said camera being a reflex camera, a first mutually extinguishing filter set located between the lens and said first and second apertures, a second mutually extingushing filter set located in proximity to film plane at the gate, a viewfinder on said camera, a focal plane on said viewfinder, a third mutually extinguishing filter set located in proximity to the focal plane of the said viewfinder; whereby right and left images appear in said viewfinder as they will photograph on the film, dark bars between said first and second areas at the film gate and corresponding first and second areas at the said focal plane of the viewfinder, said two images being displaced horizontally and the convergence angle between said first and second light ray bundles being varied by a rotation of the said second horizontal deflector.

26. A 3-dimensional camera device according to claim 19 in which the said second horizontal deflector is rotable, and in which said first means rotates said deflector about a vertical axis through an angle $\alpha$ to adjust the convergence angle $\theta$ of the left and right images; and in which the said second means moves the lens along its axis varying the distance q between the optical center of said lens and said film plane, coupling between said first and second means providng a motion through a distance $\Delta q$ proportional to the change in angle $\Delta\alpha$ of rotation of the said second horizontal deflector.

27. A 3-dimensional camera device according to claim 26, a differential to control the relative angle between the first and second output shafts.

28. A 3-dimensional camera device according to claim 26, a means for decoupling the said coupling device, and a means to independently control the angle of each of said shafts.

* * * * *

UNITED STATES PATENT OFFICE
CERTIFICATE OF CORRECTION

Patent No. 3,990,087            Dated November 2, 1976

Inventor(s)   Alvin M. Marks et al.        Page 1 of 2

It is certified that error appears in the above-identified patent and that said Letters Patent are hereby corrected as shown below:

Column 2, line 59, "when" should read -- which --.

Column 3, line 9, "which is" should read -- which in --.

Column 3, line 24, "if" should read -- is --.

Column 3, line 42, "if" should read -- is --.

Column 3, line 50, "convering" should read -- covering --.

Column 8, line 25, "mm" should read -- m --.

Column 8, line 32, "mm" should read -- m --.

Column 8, line 43, "$\Delta\theta = 3.8 = 0 = 3.8°$" should read -- $\Delta\theta = 3.8 - 0 = 3.8°$ --.

Column 8, line 50, "$\approx 2.5$" should be deleted and inserted on line 51, same column 8, before "mm".

Column 10, line 6, "Thee" should read -- The --.

Column 10, line 15, "imagme" should read -- image --.

Column 10, line 49, "means" should read -- mean --.

Column 13, line 2, "8" should read -- 9 --.

Column 13, line 6, "8" should read -- 9 --.

UNITED STATES PATENT OFFICE
CERTIFICATE OF CORRECTION

Patent No. 3,990,087  Dated November 2, 1976

Inventor(s) Alvin M. Marks et al.    Page 2 of 2

It is certified that error appears in the above-identified patent and that said Letters Patent are hereby corrected as shown below:

Column 13, line 7, "plarizing" should read -- polarizing --.

Column 13, line 39, "frist" should read -- first --.

Column 13, line 58, "a film gate", second occurrence, should read -- a film frame at said film gate --.

Column 13, line 56, "monocula" should read -- monocular --.

Signed and Sealed this

Eleventh Day of January 1977

[SEAL]

Attest:

RUTH C. MASON  
Attesting Officer

C. MARSHALL DANN  
Commissioner of Patents and Trademarks